United States Patent [19]
Agans, Jr.

[11] Patent Number: 5,844,367
[45] Date of Patent: Dec. 1, 1998

[54] AUXILIARY CAP LIGHT KIT ACTUATED BY THE TAILGATE

[76] Inventor: Robert W. Agans, Jr., 517 Haws La., Oreland, Pa. 19075

[21] Appl. No.: 832,903

[22] Filed: Apr. 3, 1997

[51] Int. Cl.[6] .................................................. B60Q 3/06
[52] U.S. Cl. ............................... 315/84; 307/10.8; 362/74
[58] Field of Search ...................... 315/77, 84; 307/10.8; 362/74

[56] References Cited

U.S. PATENT DOCUMENTS

| | | | |
|---|---|---|---|
| 4,628,417 | 12/1986 | Kaminski et al. | 362/74 |
| 4,750,197 | 6/1988 | Denekamp et al. | 340/825.35 X |
| 4,786,843 | 11/1988 | Yamamoto et al. | 315/84 X |
| 5,321,309 | 6/1994 | Kolomyski | 315/84 X |
| 5,357,169 | 10/1994 | Toyozumi et al. | 315/84 X |

FOREIGN PATENT DOCUMENTS 59-114138  7/1984  Japan ........................................ 315/84

*Primary Examiner*—Robert Pascal
*Assistant Examiner*—Justin P. Bettendorf

[57] ABSTRACT

A new Auxiliary Cap Light Kit for providing illumination to the interior of a pickup truck bed cap. The inventive device includes a cap light source providing illumination to the interior of the truck bed cap The cap light source is electrically coupled to a switch having a depressible actuator that turns on the light source when the tailgate of the pickup truck is opened. The cap light source is also electrically coupled to an adjustable light illumination timer that allows a user to control the length of time the light source is powered when the tailgate is left open.

10 Claims, 3 Drawing Sheets

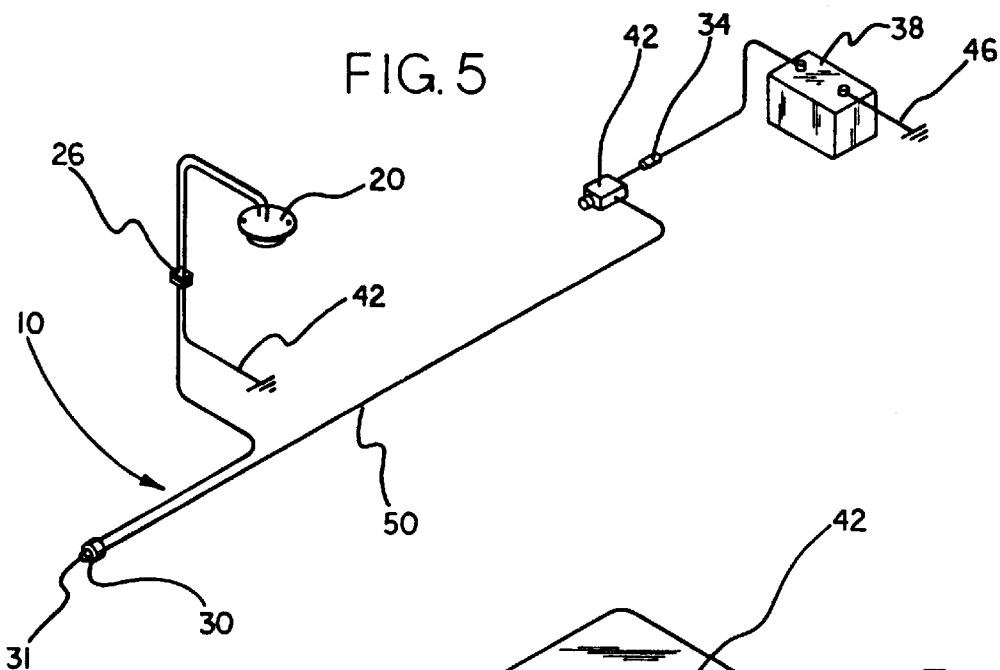
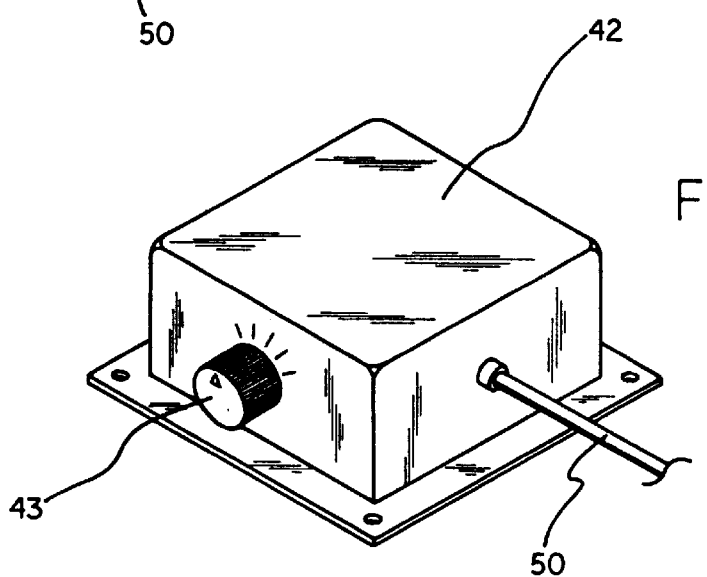
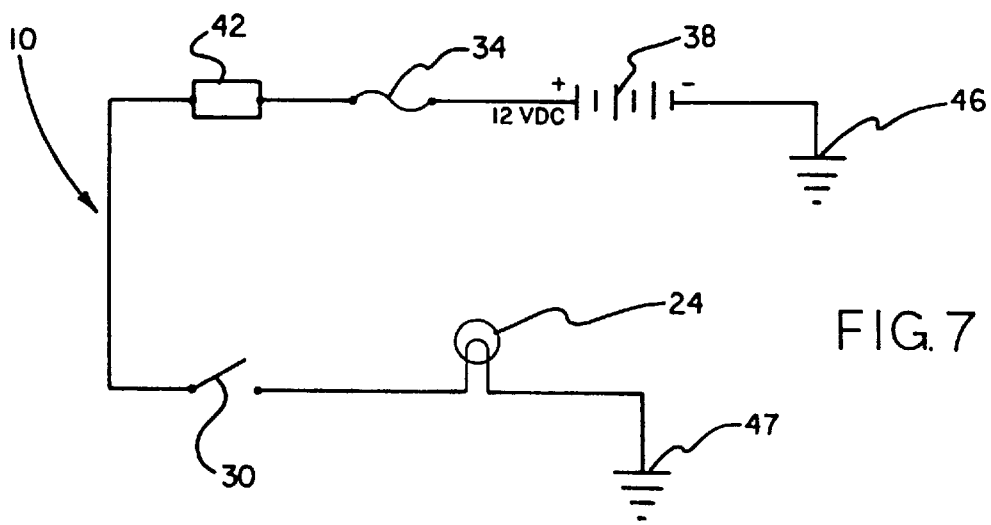

AUXILIARY CAP LIGHT KIT ACTUATED BY THE TAILGATE

BACKGROUND OF THE INVENTION

1. Field of the Invention

The present invention relates to illumination devices the for motor vehicles and more particularly pertains to a new Auxiliary Cap Light Kit for providing illumination to the interior of a pickup truck bed Cap.

2. Description of the Prior Art

The use of to illumination devices for motor vehicles is known in the prior art. More specifically, to illumination devices for motor vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art to illumination devices for motor vehicles include U.S. Pat. No. 4,896,136; U.S. Pat. No. 4,628,417; U.S. Pat. Des. No. 324,111; U.S. Pat. No. 4,819,134; U.S. Pat. No. 5,047,688 and U.S. Pat. No. 4,499,528.

While these devices fulfill their respective, particular objectives and requirements, the aforementioned patents do not disclose a new Auxiliary Cap Light Kit. The inventive device includes a cap light source providing illumination to the interior of the truck bed cap. The cap light source is electrically coupled to a switch having a depressible actuator that turns on the light source when the tailgate of the pickup truck is opened. The cap light source is also electrically coupled to an adjustable light illumination timer that allows a user to control the length of time the light source is powered when the tailgate is left open.

In these respects, the Auxiliary Cap Light Kit according to the present invention substantially departs from the conventional concepts and designs of the prior art, and in so doing provides an apparatus primarily developed for the purpose of providing illumination to the interior of a pickup truck bed cap.

SUMMARY OF THE INVENTION

In view of the foregoing disadvantages inherent in the known types of to illumination devices for motor vehicles now present in the prior art, the present invention provides a new Auxiliary Cap Light Kit construction wherein the same can be utilized for providing illumination to the interior of a pickup truck bed cap.

The general purpose of the present invention, which will be described subsequently in greater detail, is to provide a new Auxiliary Cap Light Kit apparatus and method which has many of the advantages of the to illumination devices for motor vehicles mentioned heretofore and many novel features that result in a new Auxiliary Cap Light Kit which is not anticipated, rendered obvious, suggested, or even implied by any of the prior art to illumination devices for motor vehicles, either alone or in any combination thereof.

To attain this, the present invention generally comprises a cap light source providing illumination to the interior of the truck bed cap. The cap light source is electrically coupled to a switch having a depressible actuator that turns on the light source when the tailgate of the pickup truck is opened. The cap light source is also electrically coupled to an adjustable light illumination timer that allows a user to control the length of time the light source is powered when the tailgate is left open.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Auxiliary Cap Light Kit apparatus and method which has many of the advantages of the to illumination devices for motor vehicles mentioned heretofore and many novel features that result in a new Auxiliary Cap Light Kit which is not anticipated, rendered obvious, suggested, or even implied by any of the prior art to illumination devices for motor vehicles, either alone or in any combination thereof.

It is another object of the present invention to provide a new Auxiliary Cap Light Kit which may be easily and efficiently manufactured and marketed.

It is a further object of the present invention to provide a new Auxiliary Cap Light Kit which is of a durable and reliable construction.

An even further object of the present invention is to provide a new Auxiliary Cap Light Kit which is susceptible of a low cost of manufacture with regard to both materials and labor, and which accordingly is then susceptible of low prices of sale to the consuming public, thereby making such Auxiliary Cap Light Kit economically available to the buying public.

Still yet another object of the present invention is to provide a new Auxiliary Cap Light Kit which provides in the apparatuses and methods of the prior art some of the advantages thereof, while simultaneously overcoming some of the disadvantages normally associated therewith.

Still another object of the present invention is to provide a new Auxiliary Cap Light Kit for providing illumination to the interior of a pickup truck bed cap.

Yet another object of the present invention is to provide a new Auxiliary Cap Light Kit which includes a cap light source providing illumination to the interior of the truck bed cap. The cap light source is electrically coupled to a switch having a depressible actuator that turns on the light source when the tailgate of the pickup truck is opened. The cap light source is also electrically coupled to an adjustable light illumination timer that allows a user to control the length of time the light source is powered when the tailgate is left open.

Still yet another object of the present invention is to provide a new Auxiliary Cap Light Kit that may be used for any pickup truck bed container having hinged lid or door.

Even still another object of the present invention is to provide a new Auxiliary Cap Light Kit that has an adjustable light illumination timer to prevent a pickup truck's battery from draining if the tailgate is left open for an extended period of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the wiring arrangement of the invention attached to a battery.

FIG. 6 is a perspective view of the adjustable light illumination timer.

FIG. 7 is a circuit diagram according to the present invention.

DESCRIPTION OF THE PREFERRED EMBODIMENT

Figure 1:
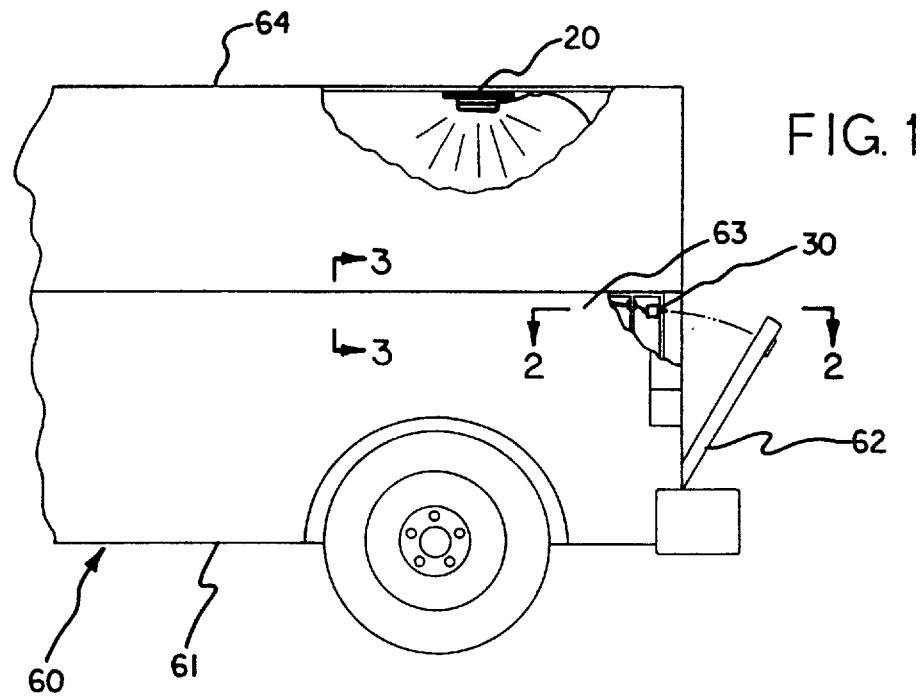
FIG. 1 is a partial side view of a pickup truck's truck bed with a truck bed cap with a new Auxiliary Cap Light Kit according to the present invention.
Figure 2:
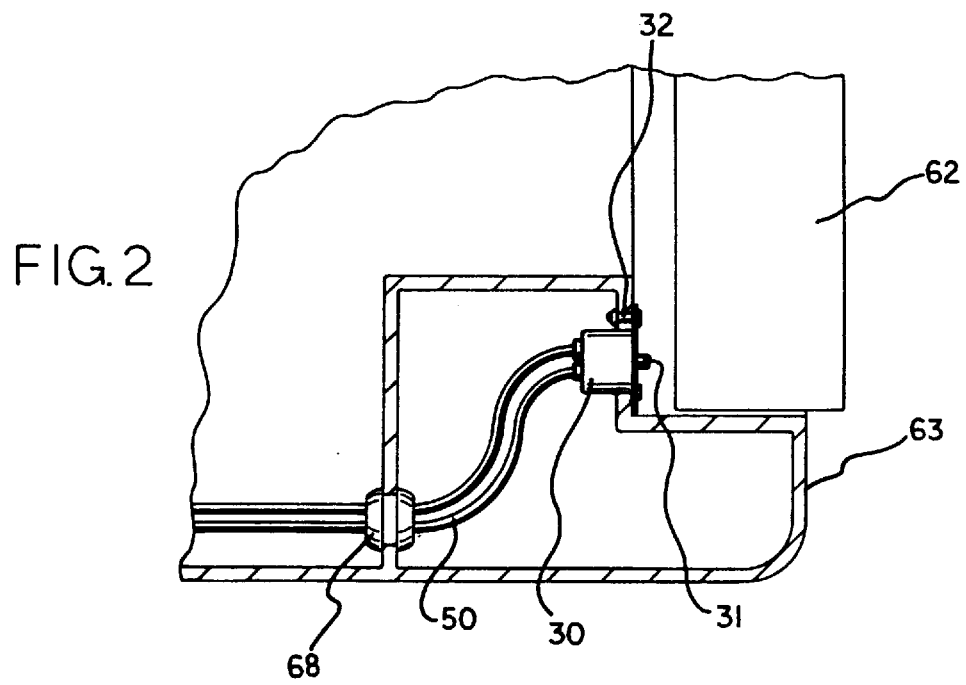
FIG. 2 is a partial sectional view taken along line 2—2 of FIG. 1 showing the location of the switch mounted in the truck bed side wall in relation to the tailgate.
Figure 3:
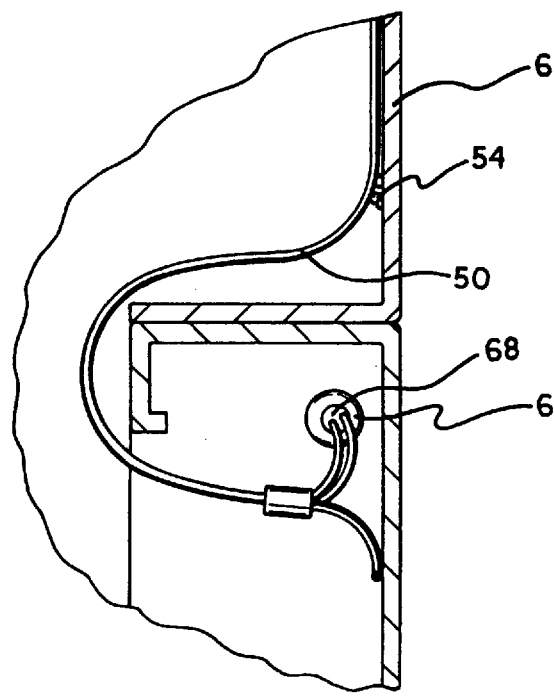
FIG. 3 is a partial sectional view taken along line 3—3 of FIG. 1 showing the electrical wires in the truck bed side wall.
Figure 4:
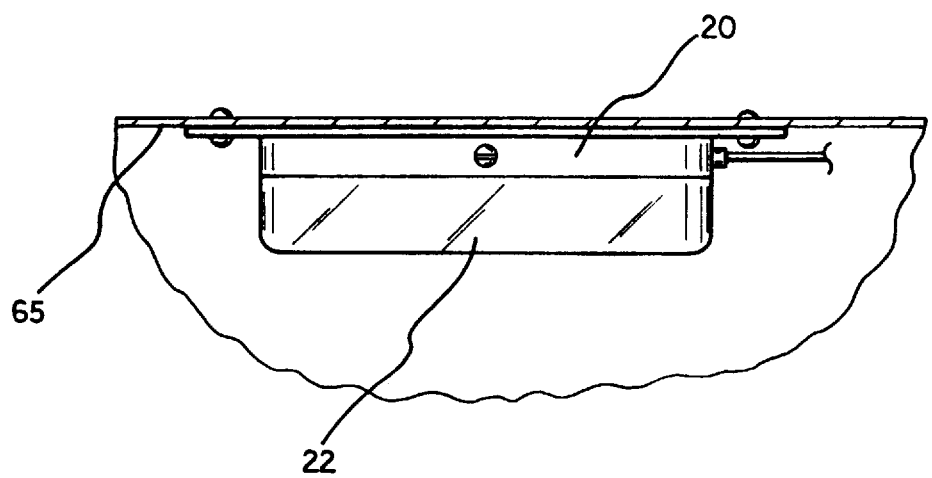
FIG. 4 is a side view of the cap light source mounted to the cap interior side.

With reference now to the drawings, and in particular to FIGS. 1 through 7 thereof, a new Auxiliary Cap Light Kit embodying the principles and concepts of the present invention and generally designated by the reference numeral 10 will be described.

More specifically, it will be noted that the Auxiliary Cap Light Kit 10 comprises a cap light source 20, a switch 30, and an adjustable light illumination timer 42.

As best illustrated in FIGS. 1 through 7, it can be shown that the Auxiliary Cap Light Kit 10 is designed for use in pickup trucks 60 having a truck bed 61 with truck bed side walls 63 and an openable rear tailgate 62. A truck bed cap 64 is attached on top of the truck bed 61.

The cap light source 20 comprises a light bulb 24 inside a light transmissible housing 22. The light transmissible housing 22 is attached to the cap interior side 65. The light bulb 24 is electrically coupled to the switch 30 and to a ground 47 by electrical wire 50. A detachable two way connector 26 may be installed between the light bulb 24 and the switch 30 and ground 47 so that the light source may be easily removed and reinstalled on a truck bed cap 64 for maintenance or other purposes.

The switch 30 has a depressible actuator 31 that turns off the light bulb 24 when it is depressed and turn the light bulb 24 on when not depressed. The switch 30 is mounted to the truck bed side wall 63 with fasteners 32 next to the tailgate 62 so that the depressible actuator 31 is depressed by the tailgate 62 when the tailgate 62 is closed and not depressed when the tailgate 62 is opened. The switch 30 is electrically coupled to the adjustable light illumination timer 42 as well as the light bulb 24 by electrical wire 50. It may be necessary to provide a wiring hole 68 in the truck bed side wall 63 to allow the electrical wire 50 to pass from the switch 30 to the adjustable light illumination timer 42 and the light bulb 24. In such a case, it is recommended to place a grommet 69 within the wiring hole 68 to protect the electrical wire 50. It is also recommended to attach the electrical wire 50 to the truck bed side wall 63 and to the cap interior side 65 with an adhesive 54 to prevent the electrically wire 50 from snagging to objects carrier on the truck bed 61.

The adjustable light illumination timer 42 is electrically coupled to the switch 30 and a battery 38 by electrical wire 50. The adjustable light illumination timer 42 controls the length of time the cap light source 20 is activated when the tailgate 62 is left open to prevent excessive draining of the battery 38. A time length adjustment knob 43 included on the adjustable light illumination timer 42 allows a user to variably adjust the length of time the cap light source 20 is to be activated. For convenience, the adjustable light illumination timer 42 may be located in the cab of the pickup truck 60 to allow easy adjustment by the driver. It is recommended that the adjustable light illumination timer 42 allow adjustment of the illumination time length for up to ten minutes. The adjustable light illumination timer 42 should also include an option to deactivate the adjustable light illumination timer 42 so that the cap light source 20 may be left on as long as the tailgate 62 is left open for situations requiring extended illumination.

The battery 38 provides power to energize the cap light source 20. The battery 38 is also electrically coupled to a ground 46. The 12 volt dc battery of pickup truck 60 is suitable for this purpose. In such a case, the Auxiliary Cap Light Kit 10 should be directly wired to the truck battery bypassing the pickup truck's ignition switch. A fuse 34 may be included between the adjustable light illumination timer 42 and the battery 38. Ideally, the fuse 34 should be rated as a seven amp fuse.

The Auxiliary Cap Light Kit 10 may also be installed in other truck bed containers that include a hinged lid or door to provide illumination to the interiors of such containers. Such truck bed containers include truck bed tool chests and truck bed utility containers being commonly available today.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An auxiliary cap light kit, for a pickup truck having a truck bed with truck bed side walls, an openable tailgate, and a covering truck bed cap having a cap interior side, said auxiliary cap light kit comprising:

a cap light source being adapted for mounting to said cap interior side, said cap light source being for providing illumination when energized;

a means for selectively energizing said cap light source wherein said light source being energized when said tailgate is opened; and a means for controlling the length of time said cap light source provides illumination.

2. The auxiliary cap light kit of claim 1, wherein the cap light source comprises a light bulb, said light bulb being disposed within a light transmissible housing, said light transmissible housing being adapted for mounting to said cap interior side, said light bulb being for providing illumination when energized.

3. The auxiliary cap light kit of claim 1, wherein said means for selectively energizing said cap light source comprises a switch, said switch being electrically coupled to said cap light source, said switch further being adapted for coupling to said truck bed side wall such that said switch is closed when said tailgate is opened, whereby said cap light source is energized when said tailgate is opened.

4. The auxiliary cap light kit of claim 3, wherein said means for controlling the length of time said cap light source provides illumination is an adjustable light illumination timer, said light illumination timer being electrically coupled to said switch, said adjustable light illumination timer being for controlling the length of time said light source provides illumination after said light source is energized by said switch being closed such that said cap light source is deactivated after a predetermined time.

5. The auxiliary cap light kit of claim 3, wherein said means for selectively energizing said cap light source further comprises a battery, said battery being electrically coupled to said switch.

6. The auxiliary cap light kit of claim 3, wherein said switch includes a depressible actuator, said depressible actuator being positioned next to said tailgate such that said depressible actuator closes said switch when said tailgate is opened, whereby said cap light source is illuminated.

7. The auxiliary cap light kit of claim 1, wherein said means for controlling the length of time said cap light source provides illumination is an adjustable light illumination timer, said adjustable light illumination timer being electrically coupled to said light source such that said cap light source is deactivated after a selectable predetermined time.

8. The auxiliary cap light kit of claim 1, further comprising a circuit breaking means for interrupting energization of said cap light source.

9. The auxiliary cap light kit of claim 8, wherein said circuit breaking means is a fuse being electrically coupled to said cap light source.

10. An auxiliary cap light kit, for a pickup truck having a truck bed with truck bed side walls, an openable tailgate, and a covering truck bed cap having a cap interior side, said auxiliary cap light kit comprising:

a light transmissible housing being adapted for mounting to said cap interior side;

a light bulb being disposed within said light transmissible housing, said light bulb providing illumination when energized;

a switch having a depressible actuator, said light bulb being detachably electrically coupled to said switch, said switch being adapted for coupling to said truck bed side wall, said depressible actuator being positionable next to said tailgate such that said depressible actuator closes said switch when said tailgate is opened, whereby said cap light source is energized when said tailgate is opened;

an adjustable light illumination timer, said adjustable light illumination timer being electrically coupled to said switch, said adjustable light illumination timer being for controlling the length of time said light bulb provides illumination after said light bulb is energized by said switch;

a battery being electrically coupled to said adjustable light illumination timer, said battery providing energy to said light bulb; and a fuse being operatively disposed between said battery and said adjustable light illumination timer.

\* \* \* \* \*